US006971333B1

(12) United States Patent
Hearrell

(10) Patent No.: US 6,971,333 B1
(45) Date of Patent: Dec. 6, 2005

(54) ADJUSTABLE ANIMAL KENNEL

(76) Inventor: Chad E. Hearrell, 8860 Quail Glenn Dr., Colorado Springs, CO (US) 80920

( * ) Notice: Subject to any disclaimer, the term of this patent is extended or adjusted under 35 U.S.C. 154(b) by 0 days.

(21) Appl. No.: 10/905,887

(22) Filed: Jan. 25, 2005

(51) Int. Cl.[7] ................................................ A01K 1/02
(52) U.S. Cl. ...................................... 119/482; 119/473
(58) Field of Search ........................ 119/452, 453, 473, 119/482, 496, 497, 501, 481, 417, 751, 752; 220/529, 550, 559, 578

(56) References Cited

U.S. PATENT DOCUMENTS

| | | | | |
|---|---|---|---|---|
| 1,303,736 A | | 5/1919 | Speicher | |
| 3,490,417 A | * | 1/1970 | Swinney | 119/496 |
| 3,791,347 A | * | 2/1974 | Lovell | 119/497 |
| 4,291,645 A | | 9/1981 | Cruchelow et al. | |
| 5,054,426 A | | 10/1991 | Panarelli et al. | |
| 5,097,796 A | | 3/1992 | Reimers | |
| 5,216,977 A | | 6/1993 | Allen, Jr. | |
| 5,960,744 A | | 10/1999 | Rutman | |
| 6,571,740 B1 | * | 6/2003 | Kinder et al. | 119/497 |
| 6,581,545 B1 | | 6/2003 | Foster | |
| 6,647,925 B1 | * | 11/2003 | Waiters | 119/494 |
| 6,840,193 B2 | | 1/2005 | Kost et al. | |
| 2004/0139922 A1 | * | 7/2004 | Kost et al. | 119/482 |

* cited by examiner

*Primary Examiner*—T. Nguyen
(74) *Attorney, Agent, or Firm*—Donald R. Schoonover

(57) ABSTRACT

An animal kennel includes a top unit and a bottom unit and a divider unit. The divider unit includes two spring-biased support pins that are each accommodated in holes defined in the top unit and in the bottom unit when the kennel is in use. The holes are all spaced apart from each other in the direction of the longitudinal axis of the top and bottom units so the divider unit defines differently sized spaces when it is supported in different holes. The divider unit also includes an open mesh body so the animal has a large open space in which to reside even though the actual space is restricted.

1 Claim, 1 Drawing Sheet

ADJUSTABLE ANIMAL KENNEL

BACKGROUND OF THE INVENTION

The present invention relates to the general art of animal husbandry, and to the particular field of portable housing for animals.

Animal kennels have been in use for many years. A conventional animal kennel generally includes a lower portion, an upper portion defining an interior cavity, and a front opening. Animal kennels are created in various sizes and shapes.

The main problem with conventional kennels is that they are not adjustable for various sizes of animals.

Therefore, there is a need for an animal kennel that can be adjusted in size.

A further problem with conventional kennels is that the owner of a young pet must purchase additional larger-sized kennels as the animal increases in size, which can be costly.

Therefore, there is a need for an animal kennel that can be adjusted in size as an animal increases in size.

Another problem with conventional kennels is that when an animal is relatively small compared to the kennel, it can be difficult to train the animal not to urinate or defecate within the interior of the kennel.

Therefore, there is a need for an animal kennel that can be sized according to the size of the animal and which can increase in size without producing a living space that is too large for the animal.

While the inventor is aware of several kennels, none of these known kennels satisfy the problems discussed above. In particular, the kennels known to the inventor are not easily adjustable while still allowing the animal to feel that he has free and open space.

Therefore, there is a need for an animal kennel that can be sized according to the size of the animal and which can increase in size without producing a living space that is too large for the animal and which can still provide the animal with a feeling of a large and open space if suitable.

PRINCIPAL OBJECTS OF THE INVENTION

It is a main object of the present invention to provide an animal kennel that can be adjusted in size.

It is another object of the present invention to provide an animal kennel that can be adjusted in size as an animal increases in size.

It is another object of the present invention to provide an animal kennel that can be sized according to the size of the animal and which can increase in size without producing a living space that is too large for the animal.

It is another object of the present invention to provide an animal kennel that can be sized according to the size of the animal and which can increase in size without producing a living space that is too large for the animal and which can still provide the animal with a feeling of a large and open space if suitable.

SUMMARY OF THE INVENTION

These, and other, objects are achieved by an animal kennel that includes a top portion having a plurality of support pin-accommodating holes defined therein, a bottom portion having a plurality of support pin-accommodating holes defined therein, with the bottom portion holes all being located to be aligned with corresponding top portion holes when the top portion is in place on the bottom portion. The animal kennel further comprises a divider unit which includes an open mesh body and two spring loaded support pins. The support pins on the divider unit are located to be accommodated in the holes defined in the top portion and in the bottom portion to mount the divider portion on the top and bottom portions when the divider portion is in use.

Using the adjustable animal kennel embodying the present invention will permit the animal to be comfortably stored therein while allowing the animal to have a great deal of open space. The kennel can be easily and quickly altered as the animal grows whereby the size of the kennel can be increased as the animal grows. Therefore, only one kennel needs to be purchased and the animal will not have so much room that he will tend to treat one portion of the kennel as a restroom.

BRIEF DESCRIPTION OF THE DRAWING FIGURES

DETAILED DESCRIPTION OF THE PREFERRED EMBODIMENT

Figure 3:
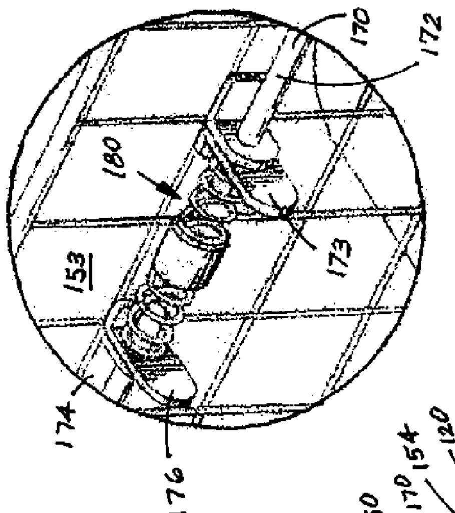
FIG. 3 is a detail view of a spring-biased support pin used in the adjustable animal kennel embodying the present invention.

Other objects, features and advantages of the invention will become apparent from a consideration of the following detailed description and the accompanying drawings.

Referring to the Figures, it can be understood that the present invention is embodied in an adjustable animal kennel which achieves the above-stated objectives.

The kennel comprises a first unit 12 which is a top unit when in use and which includes a first end wall 14 which is a rear end wall when first unit 12 is in use. First end wall 14 includes a first rim 16, which is a top rim when first unit 12 is in use, and a second rim 18, which is a bottom rim when first unit 12 is in use.

A second end wall 20 is a front end wall when first unit 12 is in use. A first rim 22 is a top rim when first unit 12 is in use, and a second rim 24 is a bottom rim when first unit 12 is in use.

A longitudinal axis 26 extends between first end wall 14 and second end wall 20.

A first side wall 30 has a first rim 32, which is a top rim when first unit 12 is in use, and a second rim 34, which is a bottom rim when first unit 12 is in use. A plurality of support pin-accommodating holes 36 are defined through first side wall 30 near top rim 32. Support pin-accommodating holes 36 are spaced apart from each other in the direction of longitudinal axis 26. First side wall 30 has a first end 38, which is unitary with first end wall 14, and a second end 40, which is unitary with second end wall 20.

A second side wall 50 has a first rim 52, which is a top rim when first unit 12 is in use, and a second rim 54, which is a bottom rim when first unit 12 is in use. A plurality of support pin-accommodating holes 56 are defined through second side wall 50 near top rim 52. Support pin-accommodating holes 56 are spaced apart from each other in the direction of longitudinal axis 26 and are aligned with corresponding support pin-accommodating holes 36 defined in first side wall 30. Second side wall 50 has a first end 56, which is unitary with first end wall 14, and a second end 58, which is unitary with second end wall 20.

A width dimension 60 extends between first side wall 30 and second side wall 50.

A third wall 64 is a top wall when first unit 12 is in use. Third wall 64 is unitary with the top rims of the end walls 14, 20 and the side walls 30, 50 of first unit 12.

A second unit 70 is a bottom unit when in use and includes a first end wall 72, which is a rear end wall when second unit 70 is in use. First end wall 72 includes a first rim 74, which is a top rim when second unit 70 is in use, and a second rim 76, which is a bottom rim when second unit 70 is in use. First rim 74 of first end wall 72 of second unit 70 is in abutting contact with second rim 18 of first end wall 14 of first unit 12 and the first end walls 14 and 72 are substantially co-planar with each other when first and second units 12 and 70 are in use.

A second end wall 80 is a front end wall when second unit 70 is in use. A first rim 82 is a top rim when second unit 70 is in use, and a second rim 84 is a bottom rim when second unit 70 is in use. First rim 82 is in abutting contact with second rim 24 of second end wall 20 of first unit 12 and second end walls 20 and 80 of first and second units 12 and 70 are substantially co-planar with each other when the first and second units 12, 70 are in use.

A longitudinal axis 86 extends between first end wall 72 and second end wall 80 of second unit 70.

A first side wall 90 of second unit 70 has a first rim 92, which is a top rim when second unit 70 is in use, and a second rim 94, which is a bottom rim when second unit 70 is in use. A plurality of support pin-accommodating holes 96 are defined through first side wall 90 near bottom rim 94. Support pin-accommodating holes in 96 are spaced apart from each other in the direction of longitudinal axis 86 of second unit 70 and are aligned with corresponding support pin-accommodating holes 56 defined in second side wall 50 of first unit 12 when first unit 12 is in use in conjunction with second unit 70. First side wall 90 has a first end 98, which is unitary with first end wall 72 of second unit 70, and a second end 100, which is unitary with second end wall 80 of second unit 70. First rim 92 of first side wall 90 of second unit 70 is in abutting contact with second rim 54 of second side wall 50 of first unit 12 and first side wall 90 of second unit 70 and second side wall 50 of first unit 12 are substantially co-planar with each other when the first and second units 12, 70 are in use.

A second side wall 110 has a first rim 112, which is a top rim when second unit 70 is in use, and a second rim 114, which is a bottom rim when second unit 70 is in use, and a plurality of support pin-accommodating holes 116 defined through second side wall 110 near bottom rim 114 of second side wall 110 of second unit 70. Support pin-accommodating holes 116 are spaced apart from each other in the direction of longitudinal axis 86 of second unit 70 and are aligned with corresponding support pin-accommodating holes 96 defined in first side wall 90 of second unit 70 and which are also aligned with corresponding support pin-accommodating holes 36 defined in first side wall 30 of first unit 12 when first unit 12 is in use in conjunction with second unit 70. Second side wall 110 has a first end 120, which is unitary with first end wall 72, and a second end 122, which is unitary with second end wall 80.

A width dimension 126 extends between first side wall 90 and second side wall 110 of second unit 70.

A third wall 130 is a bottom wall when second unit 70 is in use. Third wall 130 is unitary with the bottom rims of the end walls 72, 80 and the side walls 90, 110 of second unit 70.

A first doorway-defining hole 131 is defined through second end wall 20 of first unit 12 and a second doorway-defining hole 132 is defined through second end wall 80 of second unit 70. A doorway is defined by the first and second doorway-defining holes 131, 132 co-operating with each other when the first and second units 12, 70 are in use. First doorway-defining hole 131 includes first support pin-accommodating holes 134 defined in bottom rim 24 of second end wall 20 and second doorway-defining hole 132 includes second support pin-accommodating holes 136 defined in top rim 82 of second end wall 80. The first and second support pin-accommodating holes 134, 136 are aligned with each other when the first and second units 12, 70 are in use.

A lock unit includes a tongue element 142 mounted on at least one of the side walls of second unit 70 near the top rim of at least one side wall of the second unit 70. The lock unit further includes a catch element 144 mounted on at least one of the side walls of first unit 12 near the bottom rim of one side wall of first unit 12. Catch element 144 is adapted to releasably engage tongue element 142 when the first and second units 12, 70 are in use.

An interior volume is defined by the walls of the first and second units 12, 70 when the first and second units 12, 70 are in use.

A divider unit 150 is located in the interior volume when in use and includes an open mesh body 152 having a multiplity of openings, such as opening 153, defined therethrough, a first end 154 which is a top end and which is located near top wall 64 of first unit 12 when divider unit 150 is in use, a second end 156 which is a bottom end and which is located near bottom wall 130 of second unit 70 when divider unit 150 and the first and second units are in use, a first side 160 which is located adjacent to the first and second side walls 90, 50 of the first and second units 12, 70 when the divider unit 150 and the first and second units 12, 70 are in use, and a second side 162 which is located adjacent to the second and first side walls 110, 30 of the first and second units 12, 70 when the divider unit 150 and the first and second units 12, 70 are in use. The openings 153 through open mesh body 152 permit an animal to get the feeling of a large living space inside the kennel when, in fact, part of the living space is blocked off by divider unit 150.

A first spring-biased lock pin unit 170 is mounted on first end 154 of divider unit 150 and includes a first side lock pin 172 located adjacent to first side 160 of divider unit 150 and which is located to be accommodated in one of the plurality of lock pin-accommodating holes 56 defined in second side wall 50 of first unit 12 when divider unit 150 is in use. First side lock pin 172 includes a finger-grip element 173 thereon. A second side lock pin 174 is located adjacent to second side 162 of divider unit 150 and which is located to be accommodated in one of the plurality of lock pin-accommodating holes 36 defined in the first side wall 30 of the first unit 12 when the divider unit 150 is in use. Second side lock pin 174 includes a finger grip element 176 thereon. A spring 180 biases the first and second side lock pins 172, 174 of first lock pin unit 170 away from each other.

A second spring-biased lock pin unit 181 is mounted on second end 156 of divider unit 150 and is identical to the first spring-biased lock pin unit 170. Second spring-biased lock pin unit 181 includes a first side lock pin 182 located adjacent to first side 160 of divider unit 150 and which is located to be accommodated in one of the plurality of lock pin-accommodating holes 96 defined in first side wall 90 of second unit 70 when divider unit 150 is in use, a second side lock pin 184 is located adjacent to second side 162 of divider unit 150 and is located to be accommodated in one of the plurality of lock pin-accommodating holes 116 defined in second side wall 110 of second unit 70 when divider unit 150 is in use. A spring 186 biases the first and second side lock pins 182, 184 of second spring-biased lock pin unit 181 away from each other. Fingergrips are also located on the lock pins 182, 184 of the second lock pin unit 181 as described above with regard to the first lock pin unit 170.

A door-covering unit 200 includes a body 202 which covers the doorway 131, 132 when door covering unit 200 and the first and second units 12, 70 are in use. Body 202 includes a plurality of openings 204 defined therethrough, a first rim 206 which is a top rim and which is located adjacent to bottom rim 24 of second end wall 20 of first unit 12 when door covering unit 200 and the first and second units 12, 70 are in use. A second rim 208 is a bottom rim and is located adjacent to top rim 82 of second end wall 80 of second unit 70 when door covering unit 200 and the first and second units 12, 70 are in use.

A spring-biased lock pin unit 210 is mounted on body 202 of door covering unit 200 and includes a first support pin 212 located adjacent to top rim 206 of body 202 and which is adapted to be accommodated in one of the first support pin-accommodating holes 134 defined in the bottom rim 24 of the second end wall 20 of first unit 12 when door covering unit 150 and the first and second units 12, 70 are in use. The first support pin 212 includes a finger grip element 214 thereon that is substantially similar to finger grip elements 173, 176 hereinbefore described.

Figure 2:
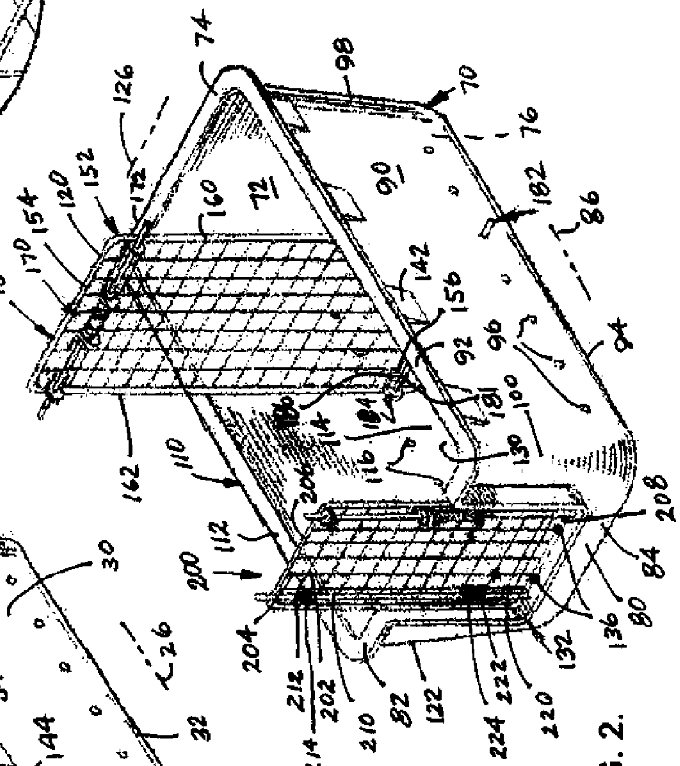
FIG. 2 is a perspective view of a top portion of the adjustable animal kennel embodying the present invention.

A second support pin 220 is located adjacent to bottom rim 208 of body 202 of door covering unit 200 and is adapted to be accommodated in one of the second support pin-accommodating holes 136 defined in the top rim 82 of the second end wall 80 of second unit 70 when the door covering unit 200 and the first and second units 12, 70 are in use. Second support pin 220 includes a finger grip element 222 thereon that is substantially similar to finger grip elements 173, 176 hereinbefore described. A spring 224 biases first and second support pins 212 and 220 away from each other. Preferably, the kennel also includes a similar spring-biased lock pin unit mounted on the opposing side of body 202 of door covering unit 200, as shown in FIG. 2.

Figure 1:
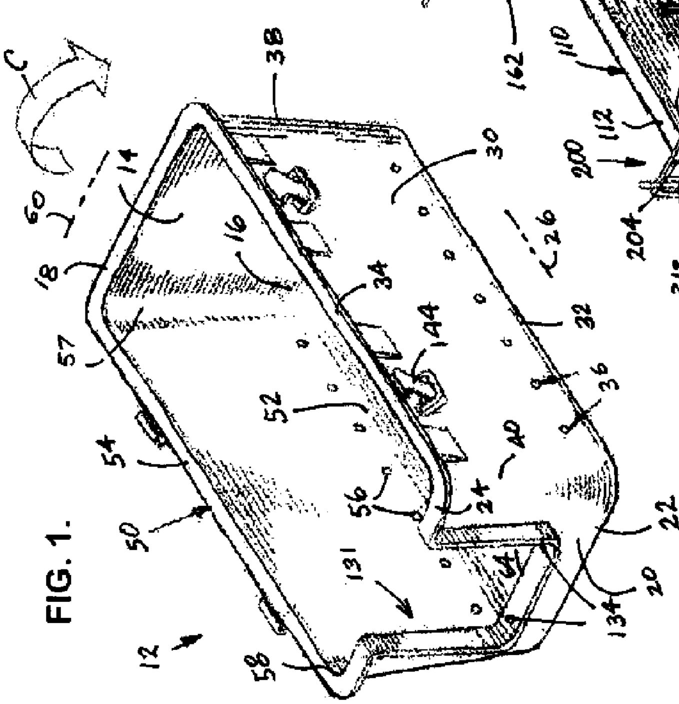
FIG. 1 is a perspective view of a bottom portion of an adjustable animal kennel embodying the present invention.

Use of the adjustable kennel can be understood from the teaching of the foregoing disclosure and thus will not be fully discussed in detail. An animal owner can purchase the kennel when the animal is a baby and the divider unit 150 is placed close to the doorway 131, 132. As the animal grows, the divider unit 150 can be moved toward the rear end walls 14, 72 to provide more room for the animal. The doorway 131, 132 is covered by door covering unit 200 to close the kennel after the first and second units 12 and 70 are assembled to close the kennel as indicated by arrow C in FIG. 1. The door covering unit 200 can be removed so the animal has easy access to the interior of the kennel. The open nature of the divider unit 150 permits the animal to feel like it has a great deal of room, but access to some of the room inside the kennel is restricted as long as the divider unit 150 is in place. As will be understood by those skilled in the art based on the teaching of the present disclosure, the adjustable kennel of the present invention can be used for more than one animal by simply moving the divider unit 150 as needed.

It is to be understood that while certain forms of the present invention have been illustrated and described herein, it is not to be limited to the specific forms or arrangements of parts as described and shown.

What is claimed is:

1. An adjustable animal kennel comprising:

A) a first unit which is a top unit when in use and which includes (1) a first end wall which is a rear end wall when said first unit is in use, the first end wall of said first unit including a first rim which is a top rim when said first unit is in use and a second rim which is a bottom rim when said first unit is in use, (2) a second end wall which is a front end wall when said first unit is in use, a first rim which is a top rim when said first unit is in use and a second rim which is a bottom rim when said first unit is in use, (3) a longitudinal axis which extends between the first end wall of said first unit and the second end wall of said first unit, (4) a first side wall having a first rim which is a top rim when said first unit is in use and a second rim which is a bottom rim when said first unit is in use and a plurality of support pin-accommodating holes defined through the first side wall near the top rim of the first side wall, the support pin-accommodating holes in the first side wall being spaced apart from each other in the direction of the longitudinal axis of said first unit, the first side wall having a first end which is unitary with the first end wall and a second end which is unitary with the second end wall, (5) a second side wall having a first rim which is a top rim when said first unit is in use and a second rim which is a bottom rim when said first unit is in use and a plurality of support pin-accommodating holes defined through the second side wall near the top rim of the second side wall, the support pin-accommodating holes in the second side wall being spaced apart from each other in the direction of the longitudinal axis of said first unit and which are aligned with corresponding support pin-accommodating holes defined in the first side wall, the second side wall having a first end which is unitary with the first end wall and a second end which is unitary with the second end wall, (6) a width dimension that extends between the first side wall of said first unit and the second side wall of the first unit, and (7) a third wall which is a top wall when said first unit is in use, the third wall being unitary with the top rims of the end walls and the side walls of said first unit;

B) a second unit which is a bottom unit when in use and which includes (1) a first end wall which is a rear end wall when said second unit is in use, the first end wall of said first unit including a first rim which is a top rim when said second unit is in use and a second rim which is a bottom rim when said second unit is in use, the first rim of the first end wall of said second unit being in abutting contact with the second rim of the first end wall of said first unit and the first end walls of said first and second units being substantially co-planar with each other when said first and second units are in use, (2) a second end wall which is a front end wall when said second unit is in use, a first rim which is a top rim when said second unit is in use and a second rim which is a bottom rim when said second unit is in use, the first rim of the second end wall of said second unit being in abutting contact with the second rim of the second end wall of said first unit and the second end walls of said first and second units being substantially co-planar with each other when said first and second units are in use, (3) a longitudinal axis which extends between the first end wall of said second unit and the second end wall of said second unit, (4) a first side wall of said second unit having a first rim which is a top rim when said second unit is in use and a second rim which is a bottom rim when said second unit is in use and a plurality of support pin-accommodating holes defined through the first side wall of said second unit near the bottom rim of the first side wall of said second unit, the support pin-accommodating holes in the first side wall of said second unit being spaced apart from each other in the direction of the longitudinal axis of said second unit and are aligned with corresponding support pin-accommodating holes defined in the second side wall of said first unit when said first unit is in use in conjunction with said second unit, the first side wall of said second unit having a first end which is unitary with the first end wall of said second unit and a second end which is unitary with the second end wall of said second unit, the first rim of the first side wall of said second unit being in abutting contact with the second rim of the first side wall of said first unit and the first side walls of said first and second units being substantially co-planar with each other when said first and second units are in use, (5) a second side wall having a first rim which is a top rim when said second unit is in use and a second rim which is a bottom rim when said second unit is in use and a plurality of support pin-accommodating holes defined through the second side wall of said second unit near the bottom rim of the second side wall of said second unit, the support pin-accommodating holes in the second side wall of said second unit being spaced apart from each other in the direction of the longitudinal axis of said second unit and are aligned with corresponding support pin-accommodating holes defined in the first side wall of said second unit, and are also aligned with corresponding support pin-accommodating holes defined in the first side wall of said first unit when said first unit is in use in conjunction with said second unit, the second side wall of said second unit having a first end which is unitary with the first end wall of said second unit and a second end which is unitary with the second end wall of said second unit, (6) a width dimension that extends between the first side wall of said second unit and the second side wall of the second unit, and (7) a third wall which is a bottom wall when said second unit is in use, the third wall being unitary with the bottom rims of the end walls and the side walls of said second unit;

C) a first doorway-defining hole defined through the second end wall of said first unit and a second doorway-defining hole defined through the second end wall of said second unit, a doorway being defined by the first and second doorway-defining holes co-operating with each other when said first and second units are in use, said first doorway-defining hole including a first support pin-accommodating hole defined in the bottom rim of the second end wall of said first unit and said second doorway-defining hole including a second support pin-accommodating hole defined in the top rim of the second end wall of said second unit, the first and second support pin-accommodating holes being aligned with each other when said first and second units are in use;

D) a lock unit which includes (1) a tongue element mounted on at least one of the side walls of said second unit near the top rim of the at least one side wall of said second unit, and (2) a catch element mounted on at least one of the side walls of said first unit near the bottom rim of the at least one side wall of said first unit and which is adapted to releasably engage the tongue element when said first and second units are in use;

E) an interior volume defined by the walls of said first and second units when said first and second units are in use;

F) a divider unit that is located in said interior volume when in use and which includes (1) an open mesh body having a multiplicity of openings defined therethrough, (2) a first end which is a top end and which is located near the top wall of said first unit when said divider unit is in use, (3) a second end which is a bottom end and which is located near the bottom wall of said second unit when said divider unit and said first and second units are in use, (4) a first side which is located adjacent to the first and second side walls of said first and second units when said divider unit and said first and second units are in use, and (5) a second side which is located adjacent to the second and first side walls of said first and second units when said divider unit and said first and second units are in use;

G) a first spring-biased lock pin unit mounted on the first end of said divider unit and which includes (1) a first side lock pin located adjacent to the first side of said divider unit and which is located to be accommodated in one of the plurality of lock pin-accommodating holes defined in the second side wall of said first unit when said divider unit is in use, the first side lock pin including a finger-grip element thereon, (2) a second side lock pin located adjacent to the second side of said divider unit and which is located to be accommodated in one of the plurality of lock pin-accommodating holes defined in the first side wall of said first unit when said divider unit is in use, the second side lock pin including a finger grip element thereon, and (3) a spring biasing the first and second side lock pins of said first spring biasing lock pin unit away from each other;

H) a second spring-biased lock pin unit mounted on the second end of said divider unit and which includes (1) a first side lock pin located adjacent to the first side of said divider unit and which is located to be accommodated in one of the plurality of lock pin-accommodating holes defined in the first side wall of said second unit when said divider unit is in use, (2) a second side lock pin located adjacent to the second side of said divider unit and which is located to be accommodated in one of the plurality of lock pin-accommodating holes defined in the second side wall of said second unit when said divider unit is in use, and (3) a spring biasing the first and second side lock pins of said second spring-biased lock pin unit away from each other; and I) a door covering unit which includes (1) a body which covers said doorway when said door covering unit and said first and second units are in use and which includes (a) a plurality of openings defined therethrough, (b) a first rim which is a top rim and which is located adjacent to the bottom rim of the second end wall of said first unit when said door covering unit and said first and second units are in use, and (c) a second rim which is a bottom rim and which is located adjacent to the top rim of the second end wall of said second unit when said door covering unit and said first and second units are in use, (2) a spring-biased lock pin unit mounted on the body of said door covering unit and which includes (a) a first support pin located adjacent to the top rim of the body of said door covering unit and which is adapted to be accommodated in one of the first support pin-accommodating holes defined in the bottom rim of the second end wall of said first unit when said door covering unit and said first and second units are in use, the first support pin including a finger grip element thereon, (b) a second support pin located adjacent to the bottom rim of the body of said door covering unit and which is adapted to be accommodated in one of the second support pin-accommodating holes defined in the top rim of the second end wall of said second unit when said door covering unit and said first and second units are in use, the second support pin including a finger grip element thereon, and (c) springs biasing the first and second support pins away from each other.

* * * * *